April 27, 1943.  W. STRAUSS  2,317,823
SCREW CAP MOLDING MACHINE
Filed Dec. 22, 1938   4 Sheets-Sheet 1

INVENTOR.
WILLIAM STRAUSS
BY Augustus B. Stoughton
ATTORNEY

April 27, 1943.  W. STRAUSS  2,317,823
SCREW CAP MOLDING MACHINE
Filed Dec. 22, 1938  4 Sheets-Sheet 3

INVENTOR.
WILLIAM STRAUSS
BY Augustus B. Stoughton
ATTORNEY

April 27, 1943. W. STRAUSS 2,317,823
SCREW CAP MOLDING MACHINE
Filed Dec. 22, 1938 4 Sheets-Sheet 4

INVENTOR.
WILLIAM STRAUSS
BY Augustus B. Stoughton.
ATTORNEY

Patented Apr. 27, 1943

2,317,823

UNITED STATES PATENT OFFICE 2,317,823

SCREW CAP MOLDING MACHINE

William Strauss, Philadelphia, Pa., assignor to F. J. Stokes Machine Company, a corporation of Pennsylvania Application December 22, 1938, Serial No. 247,215
In Great Britain August 11, 1938

6 Claims. (Cl. 18—16).

This invention relates to plastic-molding machines and, more particularly, to an automatic machine for the molding of finished articles from pulverulent compounds such as, for example, Bakelite molding compound, a phenolic condensation product which hardens into the shape of the mold through the application of heat and pressure.

One purpose of this invention is to provide modifications and improvements of the Automatic molding machine described in the application of Victor I. Zelov and William Strauss, Serial #146,550, so that parts embodying screw threads such as bottle and jar caps, may be successfully molded in such a machine.

It is one object of the present invention to provide an apparatus for automatically manufacturing parts having molded screw threads from molding materials such as the kind referred to, which will be simple in contruction and so arranged that each step of the molding cycle may be automatically timed by means of a repeating controller whereby the errors inherent to manual control are eliminated.

It is also a purpose of my invention to provide unitary machine which is entirely automatic throughout the molding cycle and suitable for the economical manufacture of threaded parts from molding compounds in the common type of mold usually referred to as positive, semi-positive or flash type of mold.

The invention includes such novel features as a rotatable die or die holder;

A motor for rotating the die;

A switch controlling the supply of current to the motor;

Means for controlling the operation of the switch and other features that will be apparent from the drawings and specifications.

Referring to the drawings.

Figure 1:
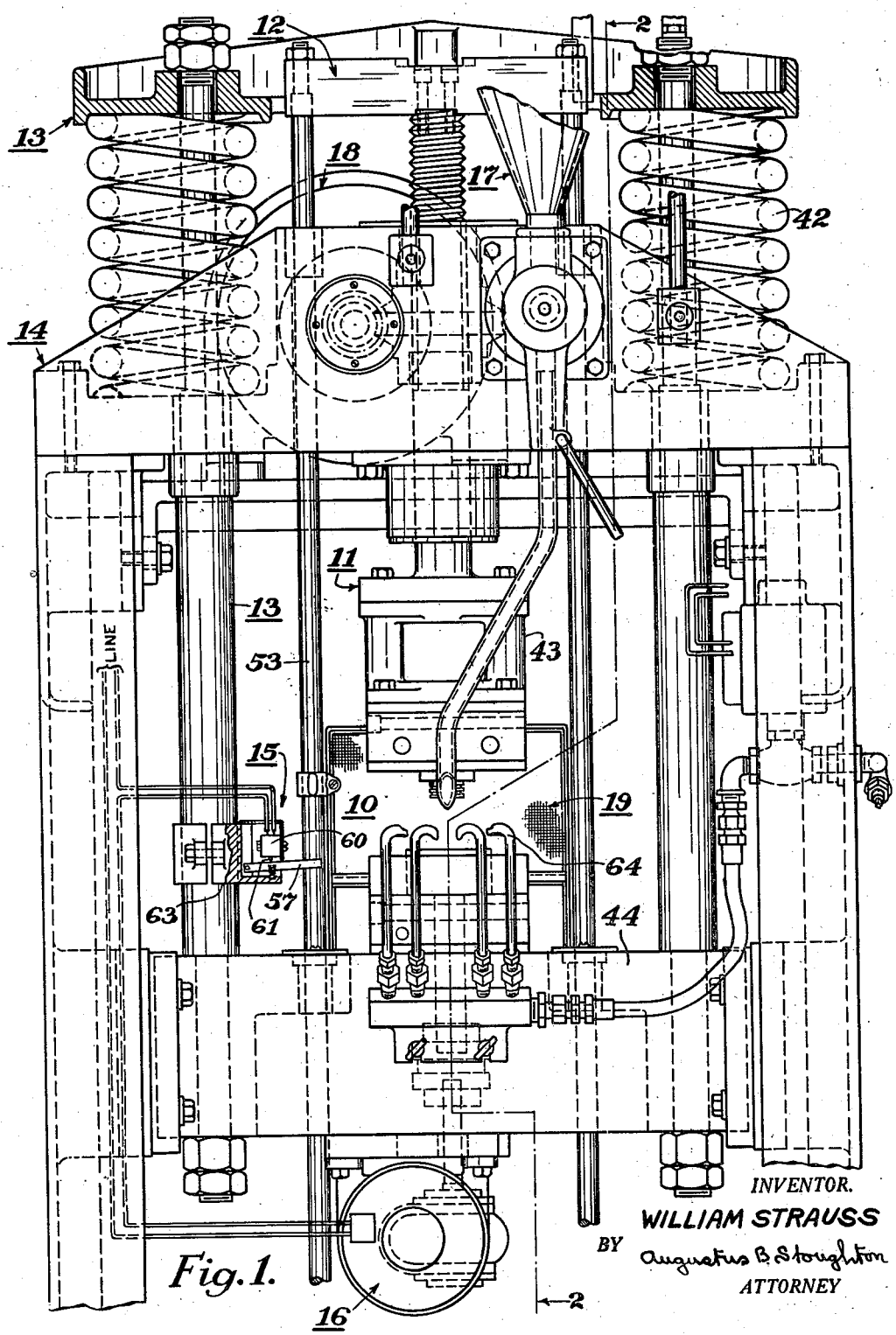
Fig. 1 is a front elevation partly in section, showing so much of a machine suitable for my purpose as is necessary to embody the improvements.
Figure 2:
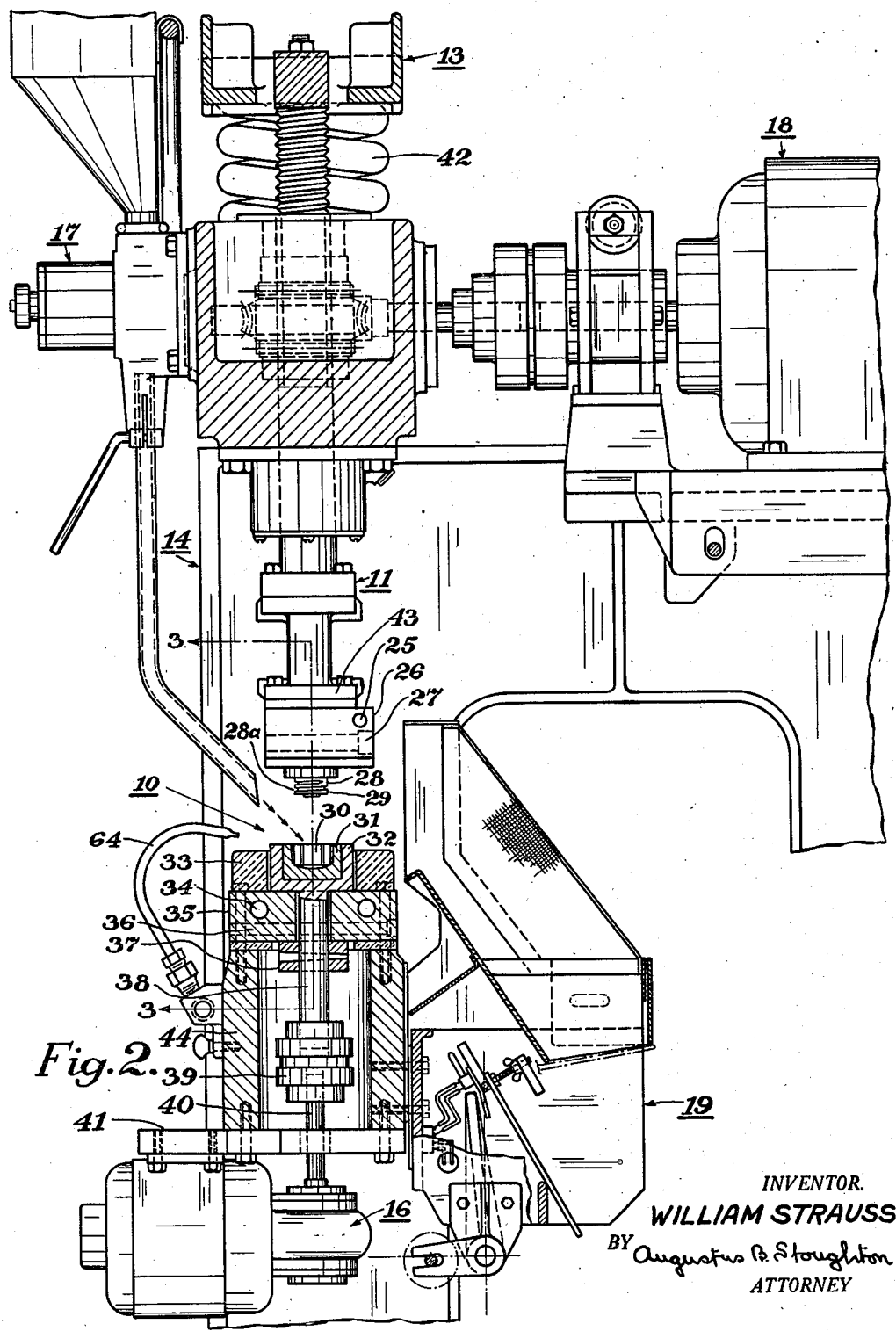
Fig. 2 is a sectional view taken on line 2—2 of Fig. 1.
Figure 3:
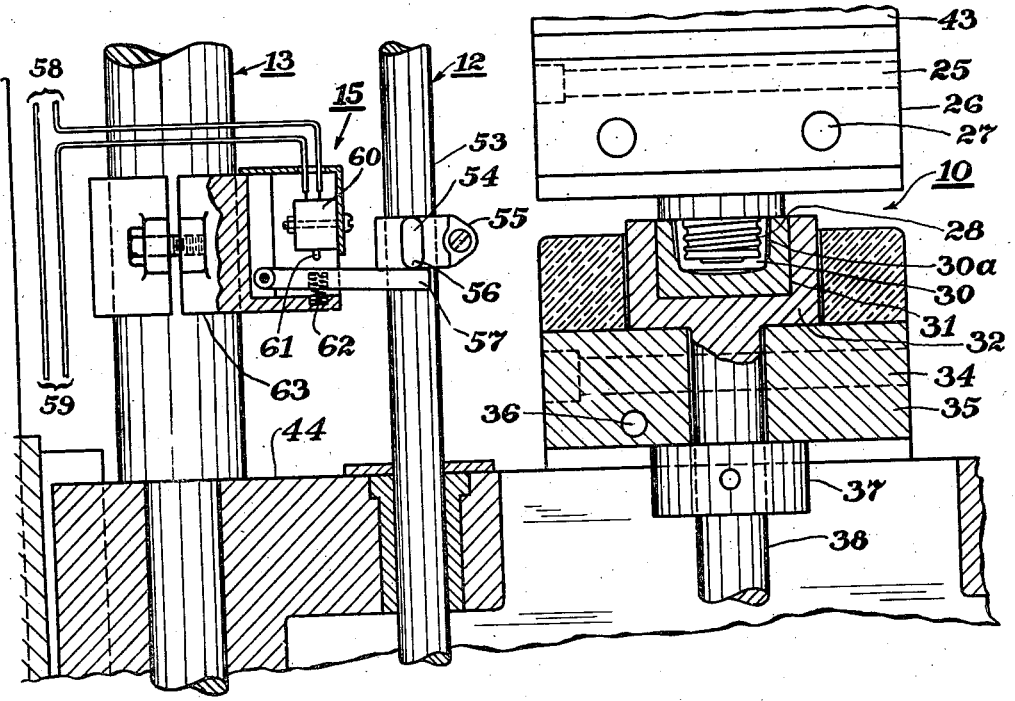
Fig. 3 is a sectional view through the die and switch mechanism.
Figure 6:
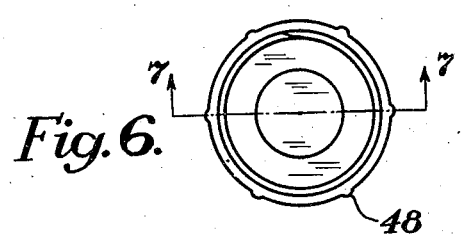
Figs. 6 and 7 show respectively a top view of a molded cap and a section through it.
Figure 7:
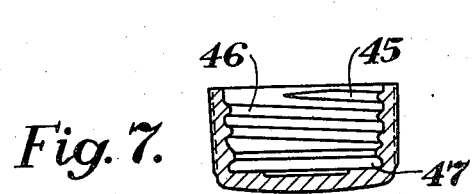
Figures 4, 5:
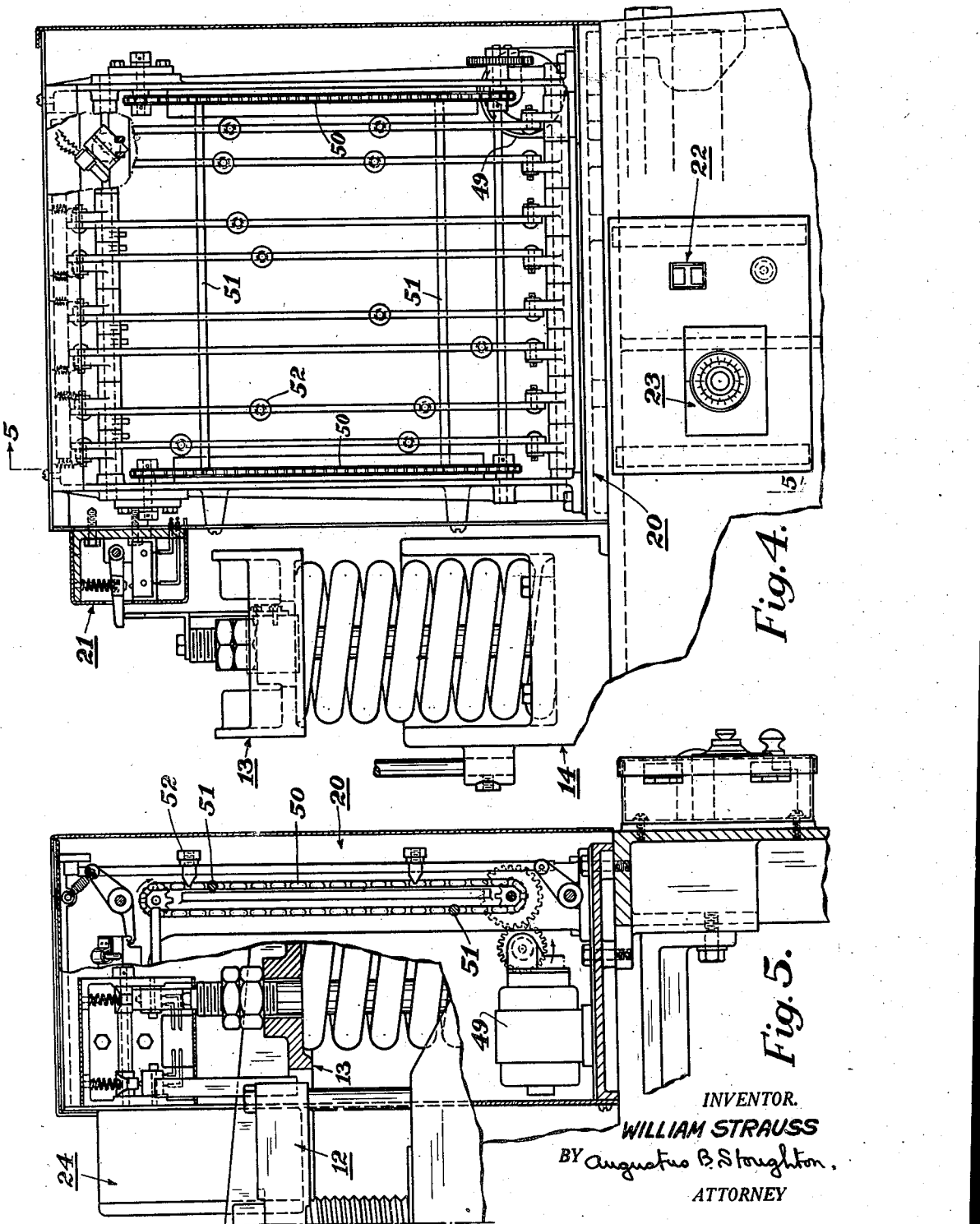
Fig. 4 is a front elevation of the controller.
Fig. 5 is a fragmentary section taken on line 5—5 of Fig. 4.

In the drawings there is shown a machine similar to one shown and described in the application of Victor I. Zelov and William Strauss, Serial #146,550, filed June 5, 1937. This machine was selected and used only for the purpose of showing the principles of application and mode of operation of my invention. There is shown at 10 (Figs. 1, 2, and 3) a mold suitable for the production of screw caps from plastic material such as phenolics, ureas, cellulose acetate, methyl methacrylate, etc., of which there now is available a large variety, the mold 10 when open as shown in Fig. 2, being supplied by the feed device 17, with a sufficient quantity of any one of these materials and then allowed to close as shown in Fig. 3, where the required pressure and heat is applied a sufficient length of time to effect the molding and curing, thus producing a piece as shown for example in Figs. 6 and 7.

The mold is of a conventional type and comprises a die 31, provided with a suitable cavity 30, mounted in a holder 32, resting on the lower platen 35 and a punch 28, attached to the upper platen 26. The upper platen 26 is provided with heating means 27 and a temperature control 25 and is mounted on the ram 11. The lower platen 35 is provided with heating means 34 and temperature control 36 and is attached to crosshead 44 of the pressure frame 13. Die holder 32 has a stem or spindle 38 extending down through lower platen 35 and connected to shaft 40 of motor 16 by the coupling 39.

On punch 28 may be seen grooves 28ª cut or formed in the cylindrical surface which will produce on the molded piece corresponding raised configurations. This may take the path of a helix thus forming a screw thread or combine a helix with a complete groove so as to form a raised ring 29 at the end of punch 28 and thereby produce both a screw thread 45-46 (Fig. 7) and an undercut 47. It is, of course, understood that the groove for threads or undercut, as the case may be, may also be cut in the die cavity 30, instead of on punch 28 in which case however, the thread would appear on the outside of the molded piece.

In conventional molding of screw caps it is customary to eject the molded piece either by stripping it off the punch in an axial direction or unscrew it after the mold is fully opened. The stripping of a cap like the one shown in Fig. 7 with its screw thread 45, 46 and undercut or gasket recess 47 is not very satisfactory as this method only permits the molding of rather shallow and imperfect threads. Threads of the standard configuration could not be stripped. Unscrewing is therefore preferable in all cases and necessary where perfectly molded threads are desired. When pieces with screw threads on the outside surface are molded, it would of course, be impossible to use the stripping method. In conventional molding very complicated mechanisms have been resorted to in the past for unscrewing but they are slow and cumbersome, and are usually manually operated. Through my invention, unscrewing of the threaded piece as it is being ejected from the mold is mechanically performed by the molding press in an automatic manner.

In general, the machine consists of a frame 14, supporting a ram 11 with its operating mechanism connected to the reversing motor 18, which is controlled through the reversing switch 24 from controller 20 so as to close or open the mold. On the frame 14 is also mounted a pressure frame 13 with its crosshead 44 and provisions 42 in the form of a spring for producing the pressure required to be exerted on the molding compound while curing. Within frame 13 is mounted another frame 12, rigidly connected to the ram 11, and therefore only acting and moving in conjunction with ram 11. This frame 12 provides the means for operating the molding powder measuring and feeding device 17 in timed relation with the movement of the ram 11. The current for master controller 20 enters through switch 22 and furnishes the energy required for operating the motor 49 which drives the controller chains 50, carrying the control bars 51, which actuate the various dogs 52 to open and close circuits in timed relation or synchronism, causing the machine to function automatically. Just as the pressure on mold 10 should vary according to the kind of molding compound and size of piece molded and therefore is made adjustable by increasing or decreasing the pressure exerted by springs 42, so the desired curing time varies and can be set to suit the requirements by means of timer 23, which is so connected in the circuit that when once set for the required curing time, the master controller 20 will start it and, after starting the timer, will stop until again restarted by timer 23, for the purpose of putting the machine through its paces of opening the mold, ejecting and discharging the molded piece, cleaning the mold, measuring and feeding the measured charge to the mold cavity, closing the mold, cleaning the face of the die around the punch and holding the mold closed under pressure the required length of time. With many pieces an additional step, that of breathing or degasing, must be introduced at a certain time in the curing period and this is taken care of by the proper setting of a set of dogs on the controller 20, so that the mold after a suitable time, will be opened for the required length of breathing time and then closed again for the curing period. The extreme limit for the movement of the ram 11, is controlled by a pair of limit switches 21, one of which acts to stop the motor when the ram has reached its topmost point of travel, and the other acts to stop the motor on its downward stroke when the proper pressure is applied to the mold and the lower crosshead 44 has been depressed so as to dwell under the required tension from springs 42. An operating check 19 is used for the purpose of controlling the continuity of operation. Every molded piece when discharged must pass through the operation check and by means of interlocking switches keep the machine in continuous operation as long as pieces are discharged, but in case of failure to discharge a molded piece, the operation check functions to stop the machine before any damage can be done.

My device is of such construction and mode of operation that it will act in synchronism with any automatic molding press if properly mounted. It consists of a new and novel die holder 32, resting on the lower platen 34, and provided with a spindle or extension 38, connected to the shaft 40 of motor 18 by means of a coupling 39. Suitable bearings for rotating the die holder 32 may be provided at any convenient place, for example, in the aperture provided for spindle 38 as it passes through the lower platen 35. To hold the die holder 32 from up or down movement, a collar 37 may be fastened to spindle 38. Any kind of a die 31, with a suitable cavity may be mounted within die holder 32, so as to act in conjunction with a proper punch 29 in molding articles from plastic material. The customary heat supplying means are provided at 27 for upper platen 26 and at 34 for the lower platen 35 and temperature control means are indicated at 25 for the upper platen 26 and at 36 for lower platen 35. The source of heat which may be electric, steam or gas, of course determines the type of control needed. The molding of a piece from plastic material will proceed in the conventional way until the point of ejecting and discharging the molded piece.

It is evident that the only proper way of removing a piece or separating it from the part of the mold to which it is held by ridges or screw threads, whether these be on the core or in the cavity, is by rotating either one or the other member of the mold while the piece is held from rotation by the corresponding member of the mold. While I have shown means for rotating the lower part or die cavity of the mold, it would be apparent to those versed in the art that the reverse could be accomplished just as easily along the same principles, resulting in exactly the same effect. The rotating mold member however, must remain stationary at certain periods in the mold cycle, while on the other hand, it should start to rotate at a definite point in the cycle corresponding with the position of the ram so that the proper relationship would exist, permitting the molded piece to undo itself from the one or the other member of the mold. The speed of rotation, or revolutions per minute, naturally must be within certain limits so as to complete the unscrewing of the piece from the threaded mold part while the piece is still held from rotating with respect to the other mold part. Variable speed devices or motors may be resorted to, although not essential, in presenting the principles of my invention. For general purposes, I have found the geared head motor with the connection 39 made to the slow speed shaft quite satisfactory, operating the slow speed at a rate approximately such as to work in harmony with the travel of ram 11 and the axial distance covered in unscrewing the molded piece completely from the threaded mold member just before it is freed from the corresponding retaining mold member. To operate my device successfully, however, requires sensitive and positive switching devices so that the motor will start at the proper moment in the molding cycle as well as stop from rotating at the proper time. It is evident that the rotation must not start before the pressure between the mold members is released and must not continue after the pressure has commenced to be applied.

The switching arrangement comprises the switch unit 15, mounted in any convenient way, for example, to frame 13, so that it will not be affected by the relative variation which exists with varying pressures on the mold. Any kind of quick acting make and break switch may be used, as for example 60, shown mounted within the housing 63, with terminal connections 58 and 59, so as to make or break the circuit connected to motor 18. Because of the long movement required where the motor must remain stationary, I have provided a lever 57, mounted within the housing 63 and urged by the spring 62 against the switch button 61. Assuming that normally when the mold is open rotation is to take place, then a normally open switch might be used so that in the position shown, Fig. 1, the circuit would be closed and the motor rotating the mold member, while the switch in Fig. 3 would be open and the rotation stopped. In order to stop the motor at the desired period in the cycle, a switch finger is attached to side rod 53 of frame 12 and placed at such a point or distance from lever 57 that it will break the circuit at the desired time and hold it open until returned to that same position. From previous descriptions it is understood that frame 12 is actuated or moved by the ram itself and therefore switch finger 54 will move in unison with the punch member of the mold. As no two molds are exactly alike or no two molded pieces are exactly the same dimensions, the position of both the units 15 and switch finger 54 is made adjustable and can be set to perform the unscrewing operation at the desired time in the cycle. The difference in position of lever 57, can readily be observed by comparing the two drawings and a considerable amount of lost motion between the lever 57 and the contact point 61 of the switch can be noted and, as described above, varied to suit the need of the particular mold and molded piece being made.

In molding an article from plastic molding material including in its inner or outer surfaces ridges, undercuts, screw threads and so forth, the cycle of operation of my machine might be as follows: With the mold open as shown in Figs. 1 and 2, and ram 11 starting on its down stroke to close the mold, a charge of material already measured out will be delivered to the cavity 30 by the measuring and feeding device 17. As soon as the molding compound is delivered into the mold cavity it commences to heat up from the temperature at which the die 31 is kept and as the punch 28 also at the desired temperature enters the mold cavity 30, it compresses the molding compound within the cavity against the springs 42, reducing the powder to a plastic state, gradually forcing some of this plastic mass out over the brim of the cavity until the mold is completely closed. The controller 20 and timer 23 hold the mold closed for the predetermined time during which time the molding compound is formed into the proper shape and cured sufficiently so that it will retain its shape and resist distortion when ejected. At this point in the cycle the motor 18 is started through the action of controller 20 and retracts ram 11 and with the ram frame 12 and punch 28.

On guide rod 53, (Fig. 3) of frame 12 is clamped the trip finger 54 extending out from collar 55 and touching at 56 the switch lever 57 when the mold is closed. As shown in Fig. 3, lever 57 is depressed away from switch button 61 and therefore the current supply of power to motor 16 is broken and the die holder stationary. As the frame 12 retracts together with the ram and punch, it permits spring 62 to cause lever 57 to contact the switch button 61, establishing a current supply to motor 16 which immediately will start to rotate the die holder 32 and the combined action of the retracting ram and the rotating die unscrews the molded piece. To keep the molded piece rotating with the die 31 so as to unscrew itself like a nut from the threaded punch, ridges or flutes, and ribs are provided as indicated at 30a Fig. 3, or as indicated at 48 in Fig. 6. This construction provides interlocking engagement between the die 31 and the molded article to hold the article against rotation in the die cavity but permitting stripping of the article from the cavity by opening of the mold. If, on the other hand, the reverse condition exists and threads or ridges are formed on the outside of the molded piece, provision would naturally be made on the punch 28 to hold the molded piece from rotating in relation to it, while the ram was retracting and the unscrewing process proceeded. It will be understood that as the molded piece is being unscrewed from the punch, the force produced by co-action of the threads on the punch and on the molded piece is sufficient to strip the raised ring 29 from the gasket recess 47. The molding material is sufficiently elastic at the time of stripping to permit stripping of the ring 29 from the recess 47 without shearing or breaking the wall of the recess. The threaded part of punch 28 may be tapered somewhat so that the outer threads on the molded cap will not offer any substantial resistance to stripping of the ring 29 from the cap, see Figure 7. If desired, the threads on the punch may be formed with a diameter slightly larger than the diameter of ring 29. Through the action of the controller, the unscrewed molded piece is blown off the surface of the die 31 as soon as freed from punch 28. The air jets 64 being operated at the proper time by controller 20, directing the discharging of the molded piece into operation check 19, thus insure continuity of operation. The molded piece having been delivered to the operation check 19, the ram will commence to close the mold again causing a measured charge of material to be delivered into the cavity 30. Influenced by the movement of ram 11 and frame 12, the switch 15 is opened at the proper point and the rotation of the die stopped.

The cavity in die 31 is preferably tapered as shown in Figure 3 whereby frictional or adhesive contact between the molded article and the die cavity is broken by the initial opening movement of the mold, but the die still maintains interlocking engagement with the molded article and prevents the article from rotating with respect thereto until the article has been completely unscrewed from the threaded mold part. The tapered shape of the die cavity not only permits the breaking of adhesive contact between the molded article and the die cavity, but it also provides a certain clearance space between the molded article and the die cavity whereby air under pressure from the jets 64 may enter the die cavity and assist in ejecting the article from the cavity and into the operation check 19. It will also be noted that the die 31 is being rotated at the time the air jets are directing an air blast against the article, and the spinning of the article while being acted on by the air blast prevents any tendency of the molded article to "cock" and stick in the cavity.

It will be obvious to those skilled in the art to which the invention relates that modifications may be made in details of construction and improvement without departing from the spirit of the invention which is not limited in respect to such matters or otherwise than as the prior art and the appended claims may require.

I claim:

1. In a machine for molding articles from plastic material, the combination of a mold comprising a lower mold part having a molding cavity formed therein and an upper mold part, one of said mold parts being movable to open and close the mold, means for mounting one of said mold parts for rotation about a vertical axis, one of said mold parts having a threaded portion for forming screw threads on a molded article, and the opposite mold part having a molding portion providing an interlocking engagement with the molded article to prevent rotation of the molded article with respect thereto but permitting stripping of the molded article therefrom by the opening of the mold, means for separating said mold parts to break the adhesive contact between said article and said opposite mold part while maintaining interlocking engagement therebetween, and means responsive to the initial opening movement of said mold for rotating said rotatable mold part in timed relation with the separation of said mold parts to be completely unscrew the molded article from the threaded mold part while said article is in interlocking engagement with said opposite mold part.

2. In a machine for molding articles from plastic material, the combination of a mold comprising a lower mold part having a molding cavity formed therein and an upper mold part, one of said mold parts being movable to open and close the mold, means for mounting one of said mold parts for rotation about a vertical axis, one of said mold parts having a threaded portion for forming screw threads on a molded article, and the opposite mold part having a molding portion providing an interlocking engagement with the molded article to prevent rotation of the molded article with respect thereto but permitting stripping of the molded article therefrom by the opening of the mold, means for separating said mold parts to break the adhesive contact between said article and said opposite mold part while maintaining interlocking engagement therebetween, means for rotating said rotatable mold part in timed relation with the separation of said mold parts to completely unscrew the molded article from the threaded mold part while said article is in interlocking engagement with said opposite mold part, and means controlled in time relation with the opening of said mold for directing an air blast against said article to eject said article from said cavity when said article becomes unscrewed from said threaded mold part, said cavity being tapered to permit air from said blast to enter the cavity beneath said article.

3. In a machine for molding articles from plastic material, the combination of a two-part mold comprising a lower mold part having a molding cavity formed therein and an upper mold part having a threaded portion for forming screw threads on a molded article, one of said mold parts being movable to open and close the mold, means for mounting one of said mold parts for relative rotation with respect to the other mold part, said lower mold part having a molding portion providing an interlocking engagement with the molded article to prevent rotation of the molded article with respect thereto but permitting stripping of the molded article therefrom by the opening of the mold, means for separating said mold parts to break the adhesive contact between said article and said lower mold part while maintaining interlocking engagement therebetween, means for rotating said rotatable mold part in timed relationship with the separation of said mold parts to completely unscrew the molded article from the threaded mold part while said article is in interlocking engagement with said lower mold part, and means controlled in timed relation with the opening of said mold for directing an air blast against said article to eject said article from said cavity when said article becomes unscrewed from said threaded mold part, said cavity being tapered to permit air from said blast to enter the cavity beneath said article.

4. A machine according to claim 3 wherein the lower mold part containing the molding cavity is the rotatable mold part, and said air blast is directed against said article while said article is being rotated by said rotatable mold part.

5. In a machine for molding articles from plastic material, the combination of a mold comprising a lower mold part having a molding cavity formed therein and an upper mold part, one of said mold parts being movable to open and close the mold, means for mounting one of said mold parts for rotation about a vertical axis, one of said mold parts having a threaded portion for forming screw threads on the molded article, and the opposite mold part having a molding portion providing an interlocking engagement with the molded article to prevent rotation of the molded article with respect thereto but permitting stripping of the molded article therefrom by the opening of the mold, means for separating said mold parts to break the adhesive contact between said article and said interlocking mold part, means for rotating said rotatable mold part to break adhesive contact between said article and the threaded mold part, and means for timing the operation of said separating means and said rotating means to break adhesive contact between said article and the interlocking mold part by separation of said mold parts and to break adhesive contact between the molded article and the threaded mold part by operating said rotating means during separation of said mold parts and prior to removal of said article from interlocking engagement with said interlocking mold part.

6. In a method of forming hollow articles wherein the articles are molded between two separable molding parts, one of said parts having a mold cavity and the other having a core part entering said cavity, and wherein one of said mold parts is provided with a threaded portion for forming screw threads on the molded article and the opposite mold part has a molding portion providing an interlocking engagement with the molded article to prevent rotation of the molded article with respect thereto but permitting stripping of the molded article therefrom by separation of said mold parts, the steps of: breaking adhesive contact between the molded article and the interlocking mold part by separating said mold parts, and breaking adhesive contact between said article and the threaded mold part by rotating one of said mold parts in a direction to unscrew the molded article from the threaded mold part during separation of said mold parts and prior to removal of said article from interlocking engagement with said interlocking mold part.

WILLIAM STRAUSS.